UNITED STATES PATENT OFFICE 2,510,230

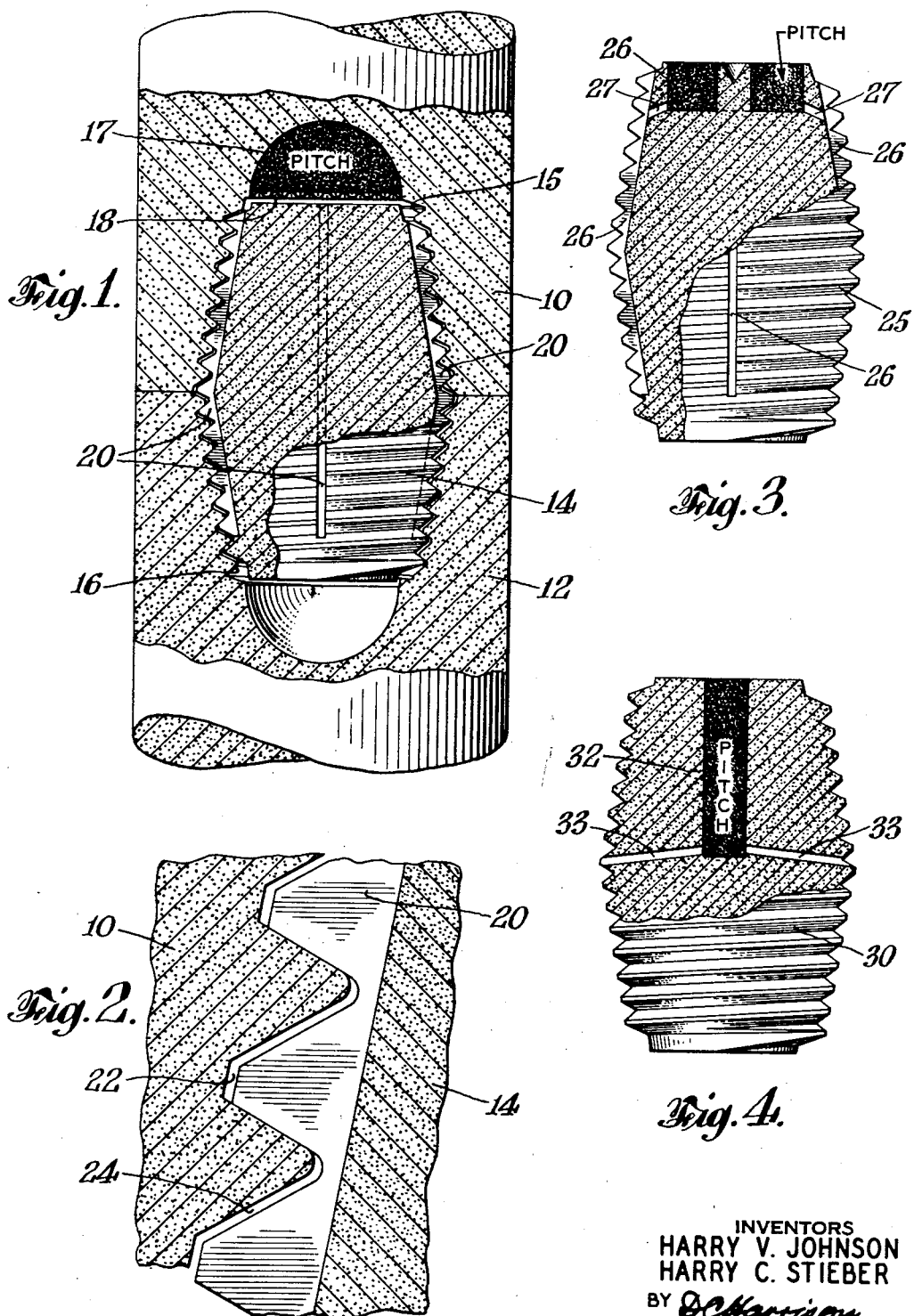

ELECTRODE JOINT

Harry V. Johnson and Harry C. Stieber, Niagara Falls, N. Y., assignors, by mesne assignments, to Union Carbide and Carbon Corporation, a corporation of New York Application January 15, 1949, Serial No. 71,168

5 Claims. (Cl. 13—18)

In the operation of electric steel melting furnaces, carbon or graphite electrodes are employed to conduct electric current from a holder to the metal through an arc which occurs between the end of the electrode and the metal being melted. Very high current is carried by these electrodes, such as for example, 40,000 amperes for a 20-inch diameter graphite electrode. Very severe conditions of temperature, vibration, mechanical and thermal shock are encountered.

In order that these electrodes may be fed continuously toward the arc as the electrode is consumed in and near the arc, these electrodes are made in convenient lengths which are connected together by a threaded nipple joint. This joint is the source of additional electrical resistance, it is of appreciably lower mechanical strength than the body of the electrode, and it is prone to become loosened due to vibration, plastic flow or other phenomena. Furthermore, as a result of thermal gradients and mechanical stresses, cracks develop in the joint vicinity, resulting in various failures such as large portions of the electrode falling off.

Objects of the present invention are to cement together the surfaces of the various parts of the joint in contact or nearly in contact so that the joint will not loosen, and so that the socket walls will adhere to the nipple and continue to function even though splits develop in the socket area, to increase the effective area through which current may pass from one electrode section to the next, to maintain lower electrical resistance and more uniform current density, and to establish a permanent mechanical bond between the electrode sections and distribute mechanical stresses in the joint area.

Other objects and features of novelty will be apparent as the following description proceeds, with reference to the accompanying drawings, in which Fig. 1 is a vertical section through an electrode joint according to the preferred embodiment of the present invention;

Fig. 2 is an enlarged detail of a portion of Fig. 1;

Fig. 3 is an elevation of a modified nipple; and

Fig. 4 is an elevation of a further modified nipple.

According to the present invention a cavity or reservoir is provided at a location in the vicinity of the top portion of the joint. This cavity is filled with a carbonizing material which produces a carbon residue upon heating, such as coal tar pitch, preferably having a melting point between 85° C. and 115° C. Channels are provided which allow the pitch, when it melts after the electrode begins to heat from the passage of current, to flow to the various surfaces where it is desired. Upon further heating the pitch is coked or carbonized, solidly cementing the joint and forming a permanent bond between surfaces and producing a low electrical resistance path for the electric current therethrough.

The preferred form of pitch containing cavity is hemispherical and located above the center of the joint, but the shape, size, and location should be such as to give least interference to passage of electric current and not to weaken the joint appreciably mechanically. Preferably, the cavity includes the space which normally exists between the top of the nipple and the inverted bottom of the upper socket into which it fits. The size of the cavity should be such as to contain, for example, approximately a quarter pound of pitch for an eight-inch electrode joint or a pound and a quarter of pitch for a twenty-inch electrode joint.

The channels leading from the cavity to the thread surfaces and electrode interfaces preferably consist of lengthwise grooves in the threaded portion of the nipple connecting with the reservoir in the top portion of the joint. Preferably, these channels are four in number located in each quadrant of the nipple and extend for almost the full length of the nipple, cutting across all threads except the bottom thread. These grooves should be only slightly greater in depth than the depth of the thread and about three-sixteenths of an inch wide. The channels may be of greater or smaller number, and may be formed in the socket threads instead of the nipple, or may be formed in the socket walls. The channels may be within the nipple, and be downwardly and outwardly inclined, or may proceed along the axis of the nipple, then along one or more radii.

Referring more particularly to the drawings, the electrode joint comprises an upper electrode section 10, a lower electrode section 12, and a threaded nipple 14, all constructed of graphite electrode material. The upper section 10 is provided with a threaded socket 15 to receive the upper end of the nipple 14, and the lower section 12 has a similar threaded socket 16 to receive the lower end of the nipple 14.

In the form shown in Fig. 1, the socket 15 is deepened to form a cavity 17 at the base of the socket, which cavity is hemispherical in shape and about the diameter of the innermost thread. This cavity is filled with coal tar pitch, which is preferably held in place by a wire screen 18 as a protection against the pitch becoming splintered in handling.

The nipple 14 is provided with vertically extending channels 20 spaced equally therearound and of a depth to extend below the roots of the nipple threads. These channels extend downwardly for the greater part of the height of the nipple, but terminate short of the lowermost thread.

As shown in Fig. 2 the ridges of the nipple threads do not contact the bottom of the corresponding grooves in the upper socket, which leaves a spiral space 22 therebetween adequate for the passage of a liquid such as melted pitch. Furthermore, when the threaded joint is tightened the lower sides of the nipple ridges bear against the upper sides of the socket grooves. This throws all of the clearance to between the upper sides of the nipple ridges and the lower sides of the socket grooves, forming another spiral space 24. In tapered sockets these spiral spaces can be controlled by the distance the nipple enters the socket.

As the electrode joint becomes heated the pitch in the cavity 17 melts and flows down the straight channels 20 and therefrom around the spiral spaces 22 and 24. With the combination of channels 20 distributing molten pitch at quadrants or other spaced points, and the helical spaces 22 and 24 between the threads providing peripheral distribution, the pitch is thoroughly distributed to all threads. The molten pitch also seeps into any space between electrode faces which are not in actual contact. Upon further heating the molten pitch carbonizes and forms a permanent mechanical bond between the electrode sections.

In the modification shown in Fig. 3 the nipple 25 has an annular groove 26 turned or bored into its upper end to form the cavity for receiving the pitch. Small inclined holes 27 are drilled through the nipple connecting the groove 26 with the vertical channels 20.

In the form shown in Fig. 4, the nipple 30 is drilled to form a central bore 32 in its top, and lateral inclined drillings 33 connect the bottom of the bore 32 with thread faces at about the center of the nipple.

The several forms of cavity location and channel arrangement for pitch cementing have been compared with a graphite joint containing no cementing substance, before and after electric heating at 1700° C. for fifteen minutes. The uncemented graphite joint had electrical resistance nearly twice that before heating, and the torque required to loosen it was only 10 to 20% of the applied tightening torque. Joints according to this invention in one instance had electrical resistance actually lower than before heating, and in other instances the electrical resistance increased of the order of 11 to 78%. In no case could the joint be loosened after heating with less than twice the tightening torque. Examination of joint sections separated by saws, hammers and chisels showed that the pitch cemented surfaces assumed a gray color and the roughness and abrasiveness of sandpaper even though the surfaces were supposedly in contact, indicating that the channeled pitch had penetrated between machined graphited surfaces. In joints in which pitch was not employed, there was no evidence of abrasiveness or characteristic gray color.

Joints according to the invention have also been tried out in furnaces in groups of three joints each. In one group the pitch was contained in a two-inch by eight-inch axial hole and four quarter-inch radial holes mid-way between the nipple ends and connecting with the axial cavity. In the other group the pitch was contained in a recess in the top end of the nipple with four end-to-end grooves along the threaded surfaces of the nipple connecting with the recess. One of each type also included pitch filled cavities in the electrode directly above the nipple. The cavities contained about a third of a pound of pitch per electrode. The joints remained tight throughout their traverse from holder to arc, and the severity of splitting was noticeably reduced.

We claim:

1. In an electrode joint in which the joining ends of the electrode sections are provided with threaded sockets, a threaded nipple is provided which has its opposite ends entering said sockets, the threads when tightened leave spiral passages therebetween, and the ends of the nipple and the bottoms of the sockets form mating faces; the improvement which comprises one of said mating faces being recessed to form a reservoir of greater volume than any clearance between said mating faces, and a quantity of carbonizable material in said reservoir adapted to melt when heated and spread therefrom over said spiral passages and adjacent portions of said nipple and sockets.

2. In an electrode joint as claimed in claim 1 in which said cavity is an extension of the socket in said upper section.

3. In an electrode joint as claimed in claim 1, in which said cavity is formed in the top of said threaded nipple.

4. In an electrode joint as claimed in claim 1, in which downwardly inclined channels extend from said cavity to said interfitting threaded portions.

5. In an electrode joint as claimed in claim 1, in which the carbonizing material is coal tar pitch having a melting point of 85° C. to 115° C.

HARRY V. JOHNSON.
HARRY C. STIEBER.

REFERENCES CITED

The following references are of record in the file of this patent:

UNITED STATES PATENTS

| Number | Name | Date |
|---|---|---|
| 979,465 | Gaston | Dec. 27, 1910 |
| 1,018,003 | Redlich | Feb. 20, 1912 |
| 1,097,227 | Hinckley | May 19, 1914 |
| 1,112,361 | Dake | Sept. 29, 1914 |
| 1,315,992 | Sejournet | Sept. 16, 1919 |
| 1,495,749 | Klugh | May 27, 1924 |
| 1,534,269 | Klugh | Apr. 21, 1925 |
| 1,572,534 | Hinckley | Feb. 9, 1926 |
| 1,785,587 | Kuhlmann | Dec. 16, 1930 |
| 2,093,390 | Wyckoff | Sept. 14, 1937 |